(12) United States Patent
Yi et al.

(10) Patent No.: US 9,497,014 B2
(45) Date of Patent: *Nov. 15, 2016

(54) METHOD OF TRANSMITTING AND RECEIVING CONTROL INFORMATION IN A WIRELESS COMMUNICATION SYSTEM

(71) Applicant: LG ELECTRONICS INC., Seoul (KR)

(72) Inventors: Seung June Yi, Anyang-si (KR); Young Dae Lee, Anyang-si (KR); Sung Duck Chun, Anyang-si (KR); Sung Jun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/984,817

(22) Filed: Dec. 30, 2015

(65) Prior Publication Data

US 2016/0119108 A1   Apr. 28, 2016

Related U.S. Application Data

(63) Continuation of application No. 14/295,207, filed on Jun. 3, 2014, now Pat. No. 9,264,160, which is a continuation of application No. 12/672,835, filed as application No. PCT/KR2008/004637 on Aug. 8, 2008, now Pat. No. 8,767,606.

(60) Provisional application No. 60/955,040, filed on Aug. 10, 2007.

(30) Foreign Application Priority Data

Aug. 7, 2008 (KR) .................. 10-2008-0077366

(51) Int. Cl.
*H04L 5/00* (2006.01)
*H04W 72/00* (2009.01)
(Continued)

(52) U.S. Cl.
CPC .............. *H04L 5/0092* (2013.01); *H04J 1/14* (2013.01); *H04L 5/001* (2013.01); *H04L 12/189* (2013.01); *H04W 72/005* (2013.01); *H04W 72/042* (2013.01); *H04W 48/12* (2013.01)

(58) Field of Classification Search
None
See application file for complete search history.

(56) References Cited

U.S. PATENT DOCUMENTS 5,754,754 A    5/1998   Dudley et al.
5,878,041 A    3/1999   Yamanaka et al.
(Continued)

FOREIGN PATENT DOCUMENTS

CN    1339903    3/2002
CN    1390425    1/2003
(Continued)

OTHER PUBLICATIONS

NTT DoCoMo, Inc., "RA response format," 3GPP TSG RAN WG2 #60bis, R2-080451, Jan. 2008, 2 pages.
(Continued)

*Primary Examiner* — Diane Lo
(74) *Attorney, Agent, or Firm* — Lee Hong Degerman Kang & Waimey; Jonathan Kang; Jeffrey Lotspeich

(57) ABSTRACT

A method of transmitting and receiving control information in a wireless communication system is disclosed. The method of receiving control information related to a specific point-to-multipoint service in a user equipment of a wireless communication system comprises receiving a notification message including indication information and an identifier identifying the point-to-multipoint service from a network, the indication information indicating at least one downlink channel related to the specific point-to-multipoint service among a plurality of downlink channels established for transmission of control information for at least one or more point-to-multipoint service, and receiving at least one downlink channel indicated by the indication information.

3 Claims, 6 Drawing Sheets

(51) Int. Cl.
*H04J 1/14* (2006.01)
*H04W 72/04* (2009.01)
*H04L 12/18* (2006.01)
*H04W 48/12* (2009.01)

(56) References Cited

U.S. PATENT DOCUMENTS

| | | | |
|---|---|---|---|
| 6,445,917 B1 | 9/2002 | Bark et al. | |
| 6,594,240 B1 | 7/2003 | Chuah et al. | |
| 6,728,918 B1 | 4/2004 | Ikeda et al. | |
| 6,738,624 B1 | 5/2004 | Aksentijevic et al. | |
| 6,862,450 B2 | 3/2005 | Mikola et al. | |
| 6,874,113 B2 | 3/2005 | Chao et al. | |
| 6,967,936 B1 | 11/2005 | Laroia et al. | |
| 6,987,985 B2 | 1/2006 | Purkayastha et al. | |
| 7,009,940 B2 | 3/2006 | Vialen et al. | |
| 7,171,163 B2 | 1/2007 | Terry et al. | |
| 7,180,885 B2 | 2/2007 | Terry | |
| 7,227,857 B2 | 6/2007 | Kuo | |
| 7,227,868 B2 | 6/2007 | Inden | |
| 7,295,573 B2 | 11/2007 | Yi et al. | |
| 7,313,116 B2 | 12/2007 | Lee et al. | |
| 7,400,593 B2 | 7/2008 | Choi et al. | |
| 7,450,933 B2 | 11/2008 | Kwak et al. | |
| 7,486,699 B2 | 2/2009 | Yi et al. | |
| 7,525,908 B2 | 4/2009 | Olsson et al. | |
| 7,706,410 B2 | 4/2010 | Chun et al. | |
| 7,710,930 B2 | 5/2010 | Kwak | |
| 7,796,505 B2 | 9/2010 | Olsson et al. | |
| 7,817,595 B2 | 10/2010 | Wu | |
| 7,876,771 B2 | 1/2011 | Bergstrom et al. | |
| 7,894,444 B2 | 2/2011 | Lohr et al. | |
| 7,978,616 B2 | 7/2011 | Chun et al. | |
| 8,027,321 B2 | 9/2011 | Zheng | |
| 8,027,363 B2 | 9/2011 | Chun et al. | |
| 8,031,689 B2 | 10/2011 | Guo | |
| 8,059,597 B2 | 11/2011 | Park et al. | |
| 8,081,662 B2 | 12/2011 | Chun et al. | |
| 8,130,687 B2 | 3/2012 | Cai et al. | |
| 8,160,012 B2 | 4/2012 | Chun et al. | |
| 8,190,144 B2 | 5/2012 | Chun et al. | |
| 8,203,988 B2 | 6/2012 | Chun et al. | |
| 8,243,931 B2 | 8/2012 | Yi et al. | |
| 8,270,361 B2 | 9/2012 | Yi et al. | |
| 8,335,189 B2 | 12/2012 | Wang et al. | |
| 8,699,711 B2 | 4/2014 | Mukherjee et al. | |
| 8,712,055 B2 | 4/2014 | Yi et al. | |
| 8,797,956 B2 | 8/2014 | Hapsari et al. | |
| 8,812,009 B2 | 8/2014 | Chun et al. | |
| 8,989,382 B2 | 3/2015 | Yi et al. | |
| 2002/0001314 A1 | 1/2002 | Yi et al. | |
| 2002/0009999 A1 | 1/2002 | Lee et al. | |
| 2002/0024972 A1 | 2/2002 | Yi et al. | |
| 2002/0114280 A1 | 8/2002 | Yi et al. | |
| 2002/0122411 A1 | 9/2002 | Zimmerman et al. | |
| 2003/0007490 A1 | 1/2003 | Yi et al. | |
| 2003/0099305 A1 | 5/2003 | Yi et al. | |
| 2003/0194992 A1 | 10/2003 | Kim et al. | |
| 2004/0008659 A1 | 1/2004 | Kim | |
| 2004/0022213 A1 | 2/2004 | Choi et al. | |
| 2004/0076182 A1 | 4/2004 | Wu | |
| 2004/0103435 A1 | 5/2004 | Yi et al. | |
| 2004/0117860 A1 | 6/2004 | Yi et al. | |
| 2004/0146019 A1 | 7/2004 | Kim et al. | |
| 2004/0147236 A1 | 7/2004 | Parkvall et al. | |
| 2004/0148396 A1 | 7/2004 | Meyer et al. | |
| 2004/0153852 A1 | 8/2004 | Wu | |
| 2004/0156330 A1 | 8/2004 | Yi et al. | |
| 2004/0184438 A1 | 9/2004 | Terry | |
| 2004/0229626 A1 | 11/2004 | Yi et al. | |
| 2005/0020260 A1 | 1/2005 | Jeong et al. | |
| 2005/0026597 A1 | 2/2005 | Kim et al. | |
| 2005/0039101 A1 | 2/2005 | Torsner | |
| 2005/0041681 A1* | 2/2005 | Lee ................ H04W 72/1289 370/437 |
| 2005/0042987 A1 | 2/2005 | Lee et al. | |
| 2005/0047416 A1 | 3/2005 | Heo et al. | |
| 2005/0054365 A1 | 3/2005 | Ahn et al. | |
| 2005/0063347 A1 | 3/2005 | Sarkkinen et al. | |
| 2005/0094596 A1 | 5/2005 | Pietraski et al. | |
| 2005/0096017 A1 | 5/2005 | Kim | |
| 2005/0100048 A1 | 5/2005 | Chun et al. | |
| 2005/0105499 A1 | 5/2005 | Shinozaki et al. | |
| 2005/0118992 A1 | 6/2005 | Jeong et al. | |
| 2005/0147040 A1 | 7/2005 | Vayanos et al. | |
| 2005/0164683 A1 | 7/2005 | Roberts et al. | |
| 2005/0169293 A1 | 8/2005 | Zhang et al. | |
| 2005/0192021 A1 | 9/2005 | Lee et al. | |
| 2005/0193309 A1 | 9/2005 | Grilli et al. | |
| 2005/0201354 A1 | 9/2005 | Hosaka et al. | |
| 2005/0213605 A1 | 9/2005 | Kim et al. | |
| 2005/0237932 A1 | 10/2005 | Liu | |
| 2005/0237972 A1 | 10/2005 | Van Dervelde et al. | |
| 2005/0238051 A1 | 10/2005 | Yi et al. | |
| 2005/0250526 A1 | 11/2005 | Lindoff et al. | |
| 2005/0254467 A1 | 11/2005 | Li et al. | |
| 2005/0259662 A1 | 11/2005 | Kim et al. | |
| 2005/0286483 A1 | 12/2005 | Lee et al. | |
| 2005/0287957 A1 | 12/2005 | Lee et al. | |
| 2006/0007886 A1 | 1/2006 | Lee et al. | |
| 2006/0030342 A1 | 2/2006 | Hwang et al. | |
| 2006/0056441 A1 | 3/2006 | Jiang | |
| 2006/0067238 A1 | 3/2006 | Olsson et al. | |
| 2006/0067289 A1 | 3/2006 | Lee et al. | |
| 2006/0067364 A1 | 3/2006 | Jung et al. | |
| 2006/0072494 A1 | 4/2006 | Matusz | |
| 2006/0072503 A1 | 4/2006 | Kim et al. | |
| 2006/0084389 A1 | 4/2006 | Beale et al. | |
| 2006/0092972 A1 | 5/2006 | Petrovic et al. | |
| 2006/0128312 A1 | 6/2006 | Declerck et al. | |
| 2006/0142020 A1 | 6/2006 | Mueckenheim et al. | |
| 2006/0154603 A1 | 7/2006 | Sachs et al. | |
| 2006/0154680 A1 | 7/2006 | Kroth et al. | |
| 2006/0165045 A1 | 7/2006 | Kim et al. | |
| 2006/0182065 A1 | 8/2006 | Petrovic et al. | |
| 2006/0203780 A1 | 9/2006 | Terry | |
| 2006/0233200 A1 | 10/2006 | Fifield et al. | |
| 2006/0251027 A1 | 11/2006 | Chun et al. | |
| 2006/0251105 A1 | 11/2006 | Kim et al. | |
| 2006/0264179 A1 | 11/2006 | Bonneville et al. | |
| 2006/0268798 A1 | 11/2006 | Kim et al. | |
| 2006/0274690 A1 | 12/2006 | Chun et al. | |
| 2006/0280145 A1 | 12/2006 | Revel et al. | |
| 2007/0047493 A1 | 3/2007 | Park et al. | |
| 2007/0053309 A1 | 3/2007 | Poojary et al. | |
| 2007/0060139 A1 | 3/2007 | Kim et al. | |
| 2007/0079207 A1 | 4/2007 | Seidel et al. | |
| 2007/0081468 A1 | 4/2007 | Timus | |
| 2007/0081513 A1 | 4/2007 | Torsner | |
| 2007/0091810 A1 | 4/2007 | Kim et al. | |
| 2007/0097913 A1 | 5/2007 | Hanov | |
| 2007/0117579 A1 | 5/2007 | Cai et al. | |
| 2007/0178878 A1 | 8/2007 | Ding | |
| 2007/0183358 A1 | 8/2007 | Cai | |
| 2007/0189205 A1 | 8/2007 | Terry et al. | |
| 2007/0201397 A1 | 8/2007 | Zhang | |
| 2007/0206530 A1 | 9/2007 | Lee et al. | |
| 2007/0223526 A1 | 9/2007 | Jiang | |
| 2007/0258591 A1 | 11/2007 | Terry et al. | |
| 2007/0268861 A1 | 11/2007 | Diachina et al. | |
| 2007/0274278 A1 | 11/2007 | Choi et al. | |
| 2007/0297360 A1 | 12/2007 | Joachim et al. | |
| 2007/0297367 A1 | 12/2007 | Wang et al. | |
| 2008/0002688 A1 | 1/2008 | Kim et al. | |
| 2008/0008152 A1 | 1/2008 | Lohr et al. | |
| 2008/0013521 A1 | 1/2008 | Rangan et al. | |
| 2008/0043658 A1 | 2/2008 | Worrall | |
| 2008/0045224 A1* | 2/2008 | Lu ........................ H04W 72/005 455/446 |
| 2008/0045272 A1 | 2/2008 | Wang et al. | |
| 2008/0049682 A1 | 2/2008 | Ding et al. | |
| 2008/0051098 A1 | 2/2008 | Rao | |
| 2008/0059859 A1 | 3/2008 | Marinier et al. | |
| 2008/0069108 A1 | 3/2008 | Yi et al. | |

(56) References Cited

U.S. PATENT DOCUMENTS

| | | | |
|---|---|---|---|
| 2008/0081598 A1 | 4/2008 | Chandra et al. | |
| 2008/0084851 A1 | 4/2008 | Kim et al. | |
| 2008/0089285 A1 | 4/2008 | Pirskanen et al. | |
| 2008/0101609 A1 | 5/2008 | Jiang | |
| 2008/0146242 A1 | 6/2008 | Alanara et al. | |
| 2008/0165717 A1 | 7/2008 | Chen et al. | |
| 2008/0165755 A1 | 7/2008 | Marinier et al. | |
| 2008/0182609 A1 | 7/2008 | Somasundaram et al. | |
| 2008/0186936 A1 | 8/2008 | Chun et al. | |
| 2008/0186944 A1 | 8/2008 | Suzuki et al. | |
| 2008/0186946 A1 | 8/2008 | Marinier et al. | |
| 2008/0198869 A1 | 8/2008 | Jiang | |
| 2008/0212561 A1 | 9/2008 | Pani et al. | |
| 2008/0232396 A1* | 9/2008 | Buckley | H04L 27/2613 370/465 |
| 2008/0233941 A1 | 9/2008 | Jen | |
| 2008/0261581 A1 | 10/2008 | Cai | |
| 2008/0268878 A1 | 10/2008 | Wang et al. | |
| 2008/0273482 A1 | 11/2008 | Lee et al. | |
| 2008/0273610 A1 | 11/2008 | Malladi et al. | |
| 2008/0318578 A1 | 12/2008 | Worrall | |
| 2009/0005058 A1 | 1/2009 | Kazmi et al. | |
| 2009/0016301 A1 | 1/2009 | Sammour et al. | |
| 2009/0046617 A1 | 2/2009 | Tenny et al. | |
| 2009/0046631 A1 | 2/2009 | Meylan et al. | |
| 2009/0046695 A1 | 2/2009 | Jiang | |
| 2009/0104890 A1 | 4/2009 | Wang et al. | |
| 2009/0116434 A1 | 5/2009 | Lohr et al. | |
| 2009/0175163 A1 | 7/2009 | Sammour et al. | |
| 2009/0232076 A1 | 9/2009 | Kuo | |
| 2009/0259908 A1 | 10/2009 | Gollapudi | |
| 2009/0305712 A1 | 12/2009 | Franceschini et al. | |
| 2009/0318177 A1 | 12/2009 | Wang et al. | |
| 2009/0323574 A1 | 12/2009 | Koskinen et al. | |
| 2010/0014466 A1 | 1/2010 | Meyer et al. | |
| 2010/0091750 A1 | 4/2010 | Lee et al. | |
| 2010/0128648 A1 | 5/2010 | Lee et al. | |
| 2010/0142429 A1 | 6/2010 | Yi et al. | |
| 2010/0142457 A1 | 6/2010 | Chun et al. | |
| 2010/0157904 A1 | 6/2010 | Ho et al. | |
| 2010/0172282 A1 | 7/2010 | Zhang et al. | |
| 2010/0232335 A1 | 9/2010 | Lee et al. | |
| 2010/0290427 A1 | 11/2010 | Sebire et al. | |
| 2011/0019604 A1 | 1/2011 | Chun et al. | |
| 2011/0033048 A1 | 2/2011 | Stanwood et al. | |
| 2011/0211516 A1 | 9/2011 | Yi et al. | |
| 2011/0305182 A1 | 12/2011 | Suzuki et al. | |
| 2013/0258919 A1 | 10/2013 | Damnjanovic | |

FOREIGN PATENT DOCUMENTS

| | | |
|---|---|---|
| CN | 1396780 | 2/2003 |
| CN | 1457202 | 11/2003 |
| CN | 1549610 | 11/2004 |
| CN | 1613210 | 5/2005 |
| CN | 1642067 | 7/2005 |
| CN | 1761260 | 4/2006 |
| CN | 1761356 | 4/2006 |
| CN | 1846365 | 10/2006 |
| CN | 1868157 | 11/2006 |
| CN | 1918825 | 2/2007 |
| CN | 1938969 | 3/2007 |
| CN | 1954521 | 4/2007 |
| CN | 1997227 | 7/2007 |
| CN | 101090281 | 12/2007 |
| EP | 1035745 | 9/2000 |
| EP | 1263160 | 12/2002 |
| EP | 1343267 | 1/2003 |
| EP | 1326397 | 7/2003 |
| EP | 1458148 | 9/2004 |
| EP | 1508992 | 2/2005 |
| EP | 1509011 | 2/2005 |
| EP | 1557967 | 7/2005 |
| EP | 1578111 | 9/2005 |
| EP | 1638237 | 3/2006 |
| EP | 1655879 | 5/2006 |
| EP | 1689130 | 8/2006 |
| EP | 1746855 | 1/2007 |
| EP | 1768297 | 3/2007 |
| EP | 1788751 | 5/2007 |
| EP | 1796405 | 6/2007 |
| EP | 2026523 | 2/2009 |
| JP | 07162948 | 6/1995 |
| JP | 2000324161 | 11/2000 |
| JP | 2001-197021 | 7/2001 |
| JP | 2002198895 | 7/2002 |
| JP | 2003018050 | 1/2003 |
| JP | 2003-115796 | 4/2003 |
| JP | 2003115876 | 4/2003 |
| JP | 2003229925 | 8/2003 |
| JP | 2003283592 | 10/2003 |
| JP | 2005073276 | 3/2005 |
| JP | 2006054718 | 2/2006 |
| JP | 2006505209 | 2/2006 |
| JP | 2006514466 | 4/2006 |
| JP | 2006121562 | 5/2006 |
| JP | 2006311543 | 11/2006 |
| JP | 2007-116639 | 5/2007 |
| JP | 2007312244 | 11/2007 |
| JP | 2008520125 | 6/2008 |
| JP | 2009521893 | 6/2009 |
| KR | 1020010045783 | 6/2001 |
| KR | 1020010062306 | 7/2001 |
| KR | 1020020004645 | 1/2002 |
| KR | 1020020012048 | 2/2002 |
| KR | 1020020097304 | 12/2002 |
| KR | 1020030060055 | 7/2003 |
| KR | 1020030068743 | 8/2003 |
| KR | 10-2004-0016065 | 2/2004 |
| KR | 1020040034398 | 4/2004 |
| KR | 1020040039944 | 5/2004 |
| KR | 1020040072961 | 8/2004 |
| KR | 1020050022988 | 3/2005 |
| KR | 1020050062359 | 6/2005 |
| KR | 1020050081836 | 8/2005 |
| KR | 1020050092874 | 9/2005 |
| KR | 1020050099472 | 10/2005 |
| KR | 1020050100882 | 10/2005 |
| KR | 1020060004935 | 1/2006 |
| KR | 1020060014910 | 2/2006 |
| KR | 10-2006-0029452 | 4/2006 |
| KR | 10-0566795 | 4/2006 |
| KR | 1020060042858 | 5/2006 |
| KR | 1020060069378 | 6/2006 |
| KR | 1020060079784 | 7/2006 |
| KR | 1020060090191 | 8/2006 |
| KR | 10-2006-0131671 | 12/2006 |
| KR | 1020060134058 | 12/2006 |
| KR | 10-0677131 | 2/2007 |
| KR | 1020070048552 | 5/2007 |
| KR | 10-2007-0073577 | 7/2007 |
| KR | 10-2007-0073588 | 7/2007 |
| KR | 10-2007-0076374 | 7/2007 |
| KR | 10-2008-0085694 | 9/2008 |
| KR | 10-0907978 | 7/2009 |
| KR | 10-2009-0084756 | 8/2009 |
| RU | 2304348 | 8/2007 |
| TW | 496058 | 7/2002 |
| WO | 01/24411 | 4/2001 |
| WO | 01/37473 | 5/2001 |
| WO | 01/39386 | 5/2001 |
| WO | 02/01742 | 1/2002 |
| WO | 03045103 | 5/2003 |
| WO | 2004/042953 | 5/2004 |
| WO | 2004042963 | 5/2004 |
| WO | 2004/100537 | 11/2004 |
| WO | 2005039108 | 4/2005 |
| WO | 2005/078967 | 8/2005 |
| WO | 2005122441 | 12/2005 |
| WO | 2005125226 | 12/2005 |
| WO | 2006/009714 | 1/2006 |
| WO | 2006/016785 | 2/2006 |
| WO | 2006/033521 | 3/2006 |
| WO | 2006-046894 | 5/2006 |

(56) References Cited

FOREIGN PATENT DOCUMENTS

| WO | 2006052086 | 5/2006 |
|---|---|---|
| WO | 2006/083149 | 8/2006 |
| WO | 2006095385 | 9/2006 |
| WO | 2006118418 | 9/2006 |
| WO | 2006/104335 | 10/2006 |
| WO | 2006/104342 | 10/2006 |
| WO | 2006/116620 | 11/2006 |
| WO | 2006/118435 | 11/2006 |
| WO | 2007/020070 | 2/2007 |
| WO | 2007/023364 | 3/2007 |
| WO | 2007024065 | 3/2007 |
| WO | 2007/045505 | 4/2007 |
| WO | 2007039023 | 4/2007 |
| WO | 2007/052921 | 5/2007 |
| WO | 2007052900 | 5/2007 |
| WO | 2007066900 | 6/2007 |
| WO | 2007/078174 | 7/2007 |
| WO | 2007/079085 | 7/2007 |
| WO | 2007078142 | 7/2007 |
| WO | 2007078164 | 7/2007 |
| WO | 2007078173 | 7/2007 |
| WO | 2007/091831 | 8/2007 |
| WO | 2007089797 | 8/2007 |
| WO | 2007126793 | 11/2007 |
| WO | 2007147431 | 12/2007 |
| WO | 2008/004725 | 1/2008 |
| WO | 2008/010063 | 1/2008 |
| WO | 2008/060097 | 5/2008 |
| WO | 2008/094120 | 8/2008 |
| WO | 2009/035301 | 3/2009 |

OTHER PUBLICATIONS

European Patent Office Application Serial No. 14177928.0, Search Report dated Sep. 29, 2014, 8 pages.
Intellectual Property Office of India Application Serial No. 4312/KOLNP/2009, Office Action dated Oct. 29, 2014, 2 pages.
Intellectual Property Office of India Application Serial No. 4404/KOLNP/2009, Office Action dated Oct. 20, 2014, 1 page.
U.S. Appl. No. 14/203,287, Office Action dated Oct. 24, 2014, 6 pages.
U.S. Appl. No. 14/295,207, Notice of Allowance Jun. 12, 2015, 10 pages.
Nokia Siemens Networks, "Security Update," 3GPP TSG-RAN2 Meeting #59bis, R2-074526, XP050137055, Oct. 2007, 4 pages.
LG Electronics Inc., "Security de-synchronization," 3GPP TSG-Ran WG2 #59, R2-073258, XP050135984, Aug. 2007, 2 pages.
European Patent Office Application Serial No. 088442132, Search Report dated Jun. 23, 2015, 6 pages.
U.S. Appl. No. 12/602,763, Office Action dated Jan. 5, 2015, 8 pages.
Intellectual Property Office of India Application Serial No. 4562/KOLNP/2009, Office Action dated Nov. 7, 2014, 2 pages.
NTT DoCoMo, Inc., "Uplink synchronization," 3GPP TSG RAN WG2 #57, R2-070781, XP-002713200, Feb. 2007, 3 pages.
Samsung, "MAC functions: ARQ," 3GPP TSG-RAN2 Meeting #51, Tdoc R2-060374, XP-002488423, Feb. 2006, 5 pages.
European Patent Office Application Serial No. 08793118.4, Search Report dated Dec. 10, 2013, 6 pages.
3rd Generation Partnership Project (3GPP); "Technical Specification Group Radio Access Network; Evolved Universal Terrestrial Radio Access (E-UTRA) Radio Link Control (RLC) protocol specification (Release 8)", 3GPP TS 36.322 V8.0.0, Dec. 2007.
"Miscellaneous corrections to TS 36.322", R2-081700, 3GPP TSG-RAN2 Meeting #61bis, Mar. 2008.
Ericsson, "Clarification to the handling of large RLC status reports", R2-082018, 3GPP TSG-RAN2 Meeting #61bis, Mar. 2008.
LG Electronics Inc. et al., "ACK_SN setting for short Status PDU", R2-082133, 3GPP TSG-RAN WG2 #62, May 2008.
LG Electronics Inc., "Handling of HFN de-synchronization," 3GPP TSG-RAN WG2 #60, R2-074746, Nov. 2007, 2 pages.
European Patent Office Application Serial No. 08793028.5, Search Report dated Mar. 12, 2014, 7 pages.
Qualcomm Europe, "UL requests", R1-070426, 3GPP TSG-RAN WG1 #47bis, Jan. 2007.
Wang, P.S., "Operation of Control Protocol Data Units in Packet Data Convergence Protocol," U.S. Appl. No. 60/976,139, Sep. 28, 2007.
Mukherjee, R.P. "Method and Apparatus of Performing Packet Data Convergence Protocol Reset," U.S. Appl. No. 61/019,058, Jan. 4, 2008.
The State Intellectual Property Office of the People's Republic of China Application Serial No. 201210332593.2, Office Action dated Sep. 3, 2014, 6 pages.
Korean Intellectual Property Office Application Serial No. 10-2008-0076181, Notice of Allowance dated Feb. 11, 2015, 2 pages.
U.S. Appl. No. 12/672,999, Final Office Action dated Jun. 6, 2013, 12 pages.
U.S. Appl. No. 14/304,515, Office Action dated Jan. 13, 2016, 16 pages.
European Patent Office Application Serial No. 14189433.7, Search Report dated Feb. 16, 2016, 5 pages.
U.S. Appl. No. 12/452,905, Office Action dated Dec. 3, 2012, 13 pages.
LG Electronics, "Update of eUtran PDCP specification", R2-081390, 3GPP TSG-RAN2 Meeting #61, Jan. 2008.
U.S. Appl. No. 12/671,020, Notice of Allowance dated Feb. 14, 2013, 11 pages.
Ghosh, A., et al.; "Random Access Design for UMTS Air-Interface Evolution"; IEEE 65th Vehicular Technology Conference, Apr. 22, 2007; pp. 1041-1045.
Sadayuki, Abeta, et al.; "Super 3G Technology Trends Part 2: Research on Super 3G Technology"; NTT DoCoMo Technical Journal, vol. 8, No. 3, pp. 55-62, Dec. 2006.
Nokia; "System Information Distribution"; 3GPP TSG-RAN WG2 Ad Hoc Meeting on LTE; R2-061487; Jun. 27, 2006.
LG Electronics; "Delivery of LTE System Information"; 3GPP TSG-RAN WG2 Ad Hoc on LTE; R2-061959; Jun. 27, 2006.
Kashima, T.; "Method and Apparatus for Providing Timing Alignment"; U.S. Appl. No. 60/944,662; Jun. 18, 2007.
Lin, L.C.; "Enhanced random access response formats in E-UTRA"; U.S. Appl. No. 61/006,348; Jan. 8, 2008.
ASUSTeK Computer Inc., "HFN de-synchronization detection with Integrity Protection scheme in a wireless communications system", U.S. Appl. No. 60/863,800.
LG Electronics Inc., "Correction of status report coding," R2-080969, 3GPP TSG RAN WG2 #61, Feb. 2008, XP-002624626.
LG Electronics, "Correction to PDCP Status Report," R2-081594, 3GPP TSG-RAN2 Meeting #61bis, Mar. 2008, XP-002624627.
Alcatel-Lucent, "PDCP status report carrying LIS only," R2-080902, 3GPP TSG RAN WG2 #61, Jan. 2008, XP-050138711.
3rd Generation Partnership Project (3GPP), "Technical Specification Group Radio Access Network; Evolved Universal Terrestrial Radio Access (E-UTRA); Packet Data Convergence Protocol (PDCP) specification (Release 8)," 3GPP TS 36.323 V8.2.1, May 2008, XP-050377638.
Qualcomm Europe, "Further Details on RACH Procedure," R1-070649, 3GPP TSG-RAN WG1 #48, Feb. 2007.
NTT DoCoMo, Inc., "Buffer Status Report and Scheduling Request triggers," R2-073574, 3GPP TSG RAN WG2 #59, Aug. 2007.
Cohen, "An Improved SSCOP-like Scheme for Avoiding Unnecessary Retransmissions and Achieving Ideal Throughput," Proceedings of IEEE Infocom Conference on Computer Communications, pp. 855-862, Mar. 1996, XP-010158150.
ZTE, "Redundant Retransmission Restraint in RLC-AM," 3GPP TSG-RAN WG2 Meeting #53, R2-061234, May 8, 2006, XP-050131180.
European Telecommunication Standards Institute (ETSI), "Digital Cellular Telecommunications System (Phase 2+), Functional Stage 2 Description of Location Services (LCS) in GERAN," ETSI Technical Specification, ETSI TS 143 059, V7.3.0, May 2007, XP-014038519.
Alcatel-Lucent, "Format for RACH Message 2", R2-080176, 3GPP TSG RAN WG2 #60bis, Jan. 2008.

(56) References Cited

OTHER PUBLICATIONS

Motorola, "Design of backoff scheme for LTE", R2-070143, 3GPP TSG-RAN-WG2 Meeting #56bis, Jan. 2007.
MAC Rapporteurs (Ericsson, Qualcomm Europe), E-UTRA MAC protocol specification update, R2-080631, 3GPP TSG-RAN2 Meeting #60bis, Jan. 2008.
U.S. Appl. No. 13/541,574 Office Action dated Oct. 23, 2013, 6 pages.
U.S. Appl. No. 12/602,763, Office Action dated Aug. 4, 2014, 10 pages.
Korean Intellectual Property Office Application Serial No. 10-2008-0077366, Notice of Allowance dated Nov. 24, 2014, 2 pages.
Intellectual Property Office of India Application Serial No. 4360/KOLNP/2009, Office Action dated Oct. 22, 2014, 2 pages.
U.S. Appl. No. 14/585,710, Office Action dated Apr. 23, 2015, 6 pages.
Motorola, "Synchronized Random Access Channel and Scheduling Request," R1-063046, 3GPP TSG RAN1#47, Nov. 2006.
NTT DoCoMo et al., "Scheduling Request Transmission Method for E-UTRA Uplink," R1-063301, 3GPP TSG RAN WG1 Meeting #47, Nov. 2006.
Ericsson, "Basic Principles for the Scheduling Request in LTE," R2-062350, 3GPP TSG RAN WG2 #54, Aug. 2006.
Ericsson et al., "Framework for Scheduling Request and Buffer Status Reporting," R2-074691, TSG-RAN WG2 Meeting #60, Nov. 2007.
Rapporteur (ASUSTeK), "Summary of HFN de-synchronization problem off-line email discussion", R2-050318, 3GPP TSG RAN WG2 #46, Feb. 2005.
ASUSTeK, "On-line recovery of HFN synchronization due to RLC UM SN problem", R2-041940, 3GPP TSG-RAN WG2 meeting #44, Oct. 2004.
3rd Generation Partnership Project (3GPP); "Technical Specification Group Radio Access Network; Evolved Universal Terrestrial Radio Access (E-UTRA) Medium Access Control (MAC) protocol specification (Release 8)", 3GPP TS 36.321 V1.0.0, Sep. 2007.
Motorola, "MAC Header format", R2-074419, 3GPP TSG-RAN2 Meeting #59bis, Oct. 2007.
NTT DoCoMo, Inc. et al, "MAC PDU structure for LTE", R2-074174, 3GPP TSG RAN WG2 #59bis, Oct. 2007.
3rd Generation Partnership Project (3GPP); "Technical Specification Group Radio Access Network; Medium Access Control (MAC) protocol specification (Release 7)", 3GPP TS 25.321 V7.5.0, Jun. 2007.
"LTE User Plane session report", R2-074536, 3GPP TSG RAN WG2 #59bis, Oct. 2008.
"Universal Mobile Telecommunications System (UMTS); Radio Link Control (RLC) protocol specification (3GPP TS 25.322 version 4.10.0 Release 4)", ETSI TS 125 322, Sep. 2003, XP-014016803.
LG Electronics Inc, "Correction to Polling Procedure", R2-081588, 3GPP TSG-RAN WG2 #61bis, Mar. 2008, XP-050139320.
Ericsson, "RLC status report format", R2-074701, TSG-RAN WG2 Meeting #60, Nov. 2007.
Itri, "Buffer Status Reporting with Group Combining for LTE", R2-072833, 3GPP TSG-RAN-WG2 Meeting #58bis, Jun. 2007.
Nec, "Considerations on Scheduling Information", R2-073556, 3GPP TSG-RAN WG2#59, Aug. 2007.
U.S. Appl. No. 12/452,905, Final Office Action dated Apr. 11, 2013, 20 pages.
LG Electronics, "Overall control signaling structure for generic LTE TDD," 3GPP TSG RAN WG1 LTE TDD Ad Hoc, R1-071848, Apr. 2007, 4 pages.
Siemens, "Signaling in DL for uplink resource allocation," 3GPP TSG RAN WG1#45, R1-061290, May 2006, 6 pages.
European Patent Office Application Serial No. 08793155.6, Search Report dated Jan. 8, 2014, 10 pages.
Qualcomm Europe, "Scheduling request mechanism", R1-071276, 3GPP TSG-RAN WG1 #48bis, Mar. 2007.
Texas Instruments, "Scheduling Request and DRX in E-UTRA", R1-072859, 3GPP TSG RAN WG1 #49bis, Jun. 2007.
Nokia Siemens Networks, "Update on Security, System Information, Mobility, MBMS and DRX", R2-073863, 3GPP TSG-RAN2 Meeting #59, Aug. 2007.
Ericsson, "SDU Discard", R2-073230, 3GPP TSG-RAN WG2 #59, Aug. 2007.
Nec; "Optimized Buffer Status Reporting"; 3GPP TSG-RAN WG2; Tdoc: R2-072515; Jun. 2007; XP-002503220.
Catt, Ritt; "Consideration on UL Buffer Reporting"; 3GPP TSG RAN WG2 #55; Oct. 2006; XP-002513924.
Texas Instruments, "UL Synchronization Management in LTE_ACTIVE," R1-071478, 3GPP TSG RAN WG1 #48bis, Mar. 2007, XP-050105413.
Texas Instruments, "UL Synchronization Management and Maintenance in E-UTRA," R1-072198, 3GPP TSG RAN WG1 #49, May 2007, XP-050105936.
LG Electronics Inc., "UE State Transition in LTE_ACTIVE," R2-061002, 3GPP TSG RAN WG2 #52, Mar. 2006, XP-050130928.
Ericsson, "Scheduling Request in E-UTRAN," R1-070471, 3GPP TSG RAN WG2 #47bis, Jan. 2007, XP-050133763.
Motorola, "Contention-Free Intra-LTE Handover," R2-070730, 3GPP TSG RAN WG2 #57, Feb. 2007, XP-050133763.

* cited by examiner

METHOD OF TRANSMITTING AND RECEIVING CONTROL INFORMATION IN A WIRELESS COMMUNICATION SYSTEM

CROSS-REFERENCE TO RELATED APPLICATIONS

This application is a continuation of U.S. patent application Ser. No. 14/295,207, filed on Jun. 3, 2014, now U.S. Pat. No. 9,264,160, which is a continuation of U.S. patent application Ser. No. 12/672,835, filed on Feb. 9, 2010, now U.S. Pat. No. 8,767,606, which is the National Stage filing under 35 U.S.C. §371 of International Application No. PCT/KR2008/004637, filed on Aug. 8, 2008, which claims the benefit of earlier filing date and right of priority to Korean Application No. 10-2008-0077366, filed on Aug. 7, 2008, and also claims the benefit of U.S. Provisional Application No. 60/955,040, filed on Aug. 10, 2007, the contents of which are all hereby incorporated by reference herein in their entirety.

TECHNICAL FIELD

The present invention relates to a wireless communication system, and more particularly, to a method of transmitting and receiving control information in a wireless communication system.

BACKGROUND ART

A multimedia broadcast multicast service (MBMS) means a streaming or background service provided to a plurality of user equipments by using a downlink dedicated MBMS bearer service. An MBMS bearer can be divided into a point-to-multipoint radio bearer service or a point-to-point radio bearer service.

The MBMS is divided into a broadcast mode and a multicast mode. The MBMS broadcast mode is a service for transmitting multimedia data to all user equipments (UEs) within a broadcast area. The broadcast area refers to a region where the broadcast service is possible. On the other hand, the MBMS multicast mode is a service for transmitting the multimedia data to a specific user equipment group only within a multicast area. The multicast area refers to a region where the multicast service is possible.

User equipments, which desire to receive a specific MBMS, should perform a subscription procedure. Subscription refers to establishing a relationship between a service provider and a user equipment. Also, the user equipments, which desire to receive the MBMS, should receive a service announcement provided by a network. The service announcement refers to providing the user equipments with a list of services to be provided and related information of the services.

Meanwhile, a user equipment which desires to receive the MBMS of the multicast mode should join a specific multicast group. The multicast group refers to a group of user equipments, which receive a specific multicast service, and joining refers to merging with a multicast group grouped to receive the specific multicast service.

The user equipment can notify the network through the joining that it desires to receive specific multicast data. On the other hand, the user equipment which has joined the multicast group can unsubscribe to joining of the multicast group, which is referred to as leaving. Each user equipment performs the subscription, joining and leaving procedures. The user equipment can perform the subscription, joining, and leaving procedures at any time, such as before data transmission, during data transmission, or after data transmission.

Meanwhile, when the specific MBMS is being performed, one or more sessions can be generated sequentially with respect to the specific MBMS. If data to be transmitted with respect to the specific MBMS are generated in MBMS data source, a core network (CN) notifies a radio network controller (RNC) of session start. On the other hand, if data to be transmitted with respect to the specific MBMS are stopped in the MBMS data source, the core network (CN) notifies the RNC of session stop. Data transfer of the specific MBMS can be performed between session start and session stop. At this time, user equipments (UE), which have joined the multicast group for the specific MBMS, can only receive the data transmitted through data transfer.

During session start, a universal terrestrial radio access network (UTRAN), which has received announcement of session start from the core network (CN), transfers MBMS notification to the user equipments (UEs). In this case, MBMS notification means that the UTRAN notifies the user equipments (UEs) that data transfer of the specific MBMS within a specific cell is upcoming.

The UTRAN can perform a counting procedure to identify the number of user equipments (UEs), which desire to receive the specific MBMS within a specific cell, through MBMS notification. The counting procedure is used to determine whether to establish a point-to-multipoint radio bearer or a point-to-point radio bearer, which provides the specific MBMS.

In order to select the MBMS radio bearer, the UTRAN establishes a threshold value internally. After performing the counting procedure, the UTRAN establishes the point-to-point MBMS radio bearer if the number of user equipments (UEs) existing in a corresponding cell is less than the threshold value. However, if the number of user equipments (UEs) existing in a corresponding cell is more than the threshold value, the UTRAN can establish the point-to-multipoint MBMS radio bearer.

If the point-to-point radio bearer is established for the specific service, all the user equipments (UEs), which desire to receive the specific service, are in RRC connected mode. However, if the point-to-multipoint radio bearer is established for the specific service, all the user equipments (UEs), which desire to receive the specific service, do not need to be in RRC connected mode. Namely, the user equipments (UEs), which are in an idle mode, can receive the specific service through the point-to-multipoint radio bearer.

A medium access control (MAC) entity, which supports MBMS, supports two types of logical channels for MBMS, i.e., a MBMS control channel (MCCH) and a MBMS traffic channel (MTCH).

The logical channel, MCCH is a point-to-multipoint downlink channel, and transmits data of a control plane related to a specific MBMS, i.e., control information to the user equipments. The logical channel, MTCH is also a point-to-multipoint downlink channel, and transmits data of a user plane related to a specific MBMS, i.e., user data to the user equipments.

DISCLOSURE OF THE INVENTION

If at least one MBMS is provided within an area, which includes one cell or a plurality of cells, a plurality of downlink channels can be established to provide control information related to the at least one MBMS. In this case, since a specific user equipment has only to receive control information related to MBMS to which the user equipment has subscribed, it needs to selectively receive a downlink channel to which the control information is transmitted. However, since a method for allowing a user equipment to selectively receive only a downlink channel to which control information is transmitted related to a specific MBMS is not disclosed in the related art, a problem occurs in that the user equipment should receive a plurality of all downlink channels, which are established.

Accordingly, the present invention is directed to a method of transmitting and receiving control information in a wireless communication system, which substantially obviates one or more problems due to limitations and disadvantages of the related art.

An object of the present invention is to provide a method of transmitting and receiving control information in a wireless communication system, in which a user equipment can efficiently receive MBMS in the wireless communication system. The MBMS and other point-to-multipoint service can be applied to the present invention. In this case, the point-to-multipoint service means a service provided using a point-to-multipoint bearer service.

To achieve these objects and other advantages and in accordance with the purpose of the invention, as embodied and broadly described herein, in one aspect of the present invention, a method of receiving control information associated with a point-to-multipoint service at a user equipment in a wireless communication system comprises receiving a notification message including indication information and an identifier identifying the point-to-multipoint service from a network, the indication information indicating at least one downlink channel related to the specific point-to-multipoint service among a plurality of downlink channels established for transmission of control information for at least one or more point-to-multipoint service, and receiving at least one downlink channel indicated by the indication information.

In another aspect of the present invention, a method of transmitting control information associated with a specific point-to-multipoint service at a network of a wireless communication system comprises transmitting a notification message including indication information and an identifier identifying the point-to-multipoint service to at least one user equipment, the indication information indicating at least one downlink channel related to the specific point-to-multipoint service among a plurality of downlink channels established for transmission of control information for at least one or more point-to-multipoint service, and transmitting control information for the point-to-multipoint service on the at least one downlink channel indicated by the indication information.

BRIEF DESCRIPTION OF THE DRAWINGS

FIG. 3A and FIG. 3B are diagrams illustrating a structure of a radio interface protocol between a user equipment (UE) and E-UTRAN, in which FIG. 3A is a schematic view of a control plane protocol and FIG. 3B is a schematic view of a user plane protocol;

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to E-UMTS (Evolved Universal Mobile Telecommunications System).

Figure 1:
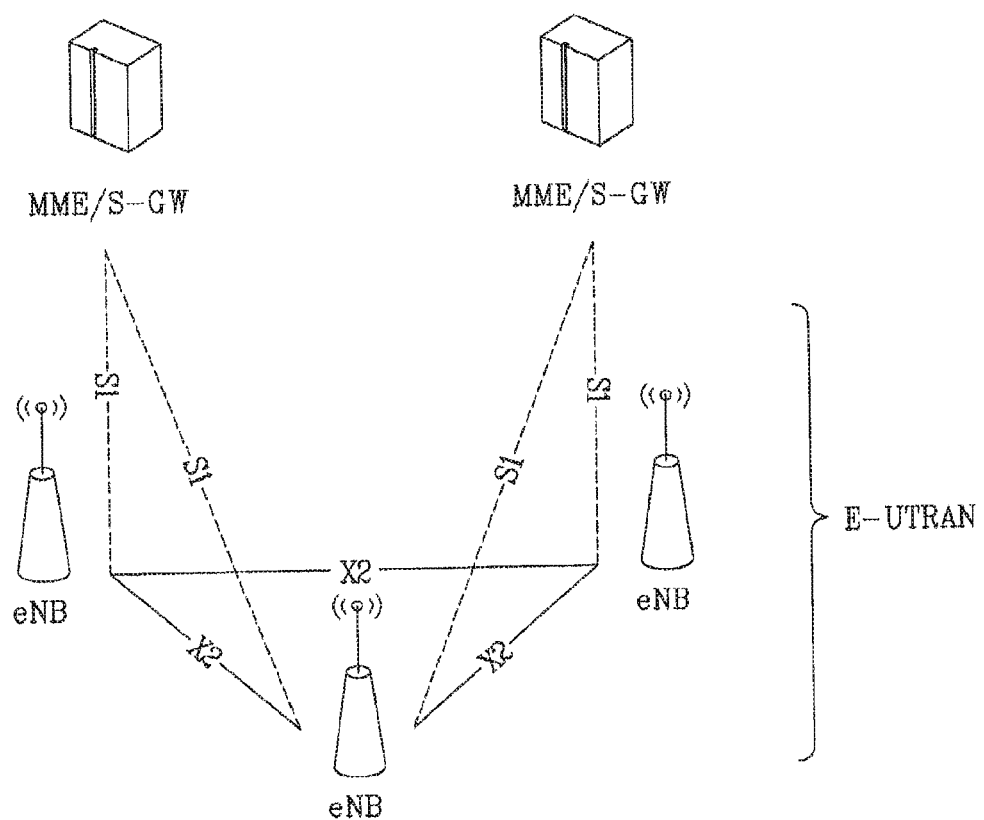
FIG. 1 is a diagram illustrating a network structure of an E-UMTS (Evolved-Universal Mobile Telecommunications System)

FIG. 1 illustrates a network structure of an E-UMTS. An E-UMTS is a system evolving from the conventional WCDMA UMTS and its basic standardization is currently handled by the 3GPP ($3^{rd}$ Generation Partnership Project). The E-UMTS can also be called an LTE (Long Term Evolution) system.

Referring to FIG. 1, an E-UTRAN includes base stations (hereinafter, referred to as 'eNode B' or 'eNB'), wherein respective eNBs are connected with each other through X2 interface. Also, each of eNBs is connected with a user equipment (UE) through a radio interface and connected with EPC (Evolved Packet Core) through S1 interface. The EPC includes a mobility management entity/system architecture evolution (MME/SAE) gateway.

Layers of a radio interface protocol between a user equipment (UE) and a network can be classified into a first layer L1, a second layer L2 and a third layer L3 based on three lower layers of OSI (open system interconnection) standard model widely known in communication systems. A physical layer belonging to the first layer L1 provides an information transfer service using a physical channel. A radio resource control (hereinafter, abbreviated as 'RRC') located at the third layer plays a role in controlling radio resources between the UE and the network. For this, the RRC layer enables RRC messages to be exchanged between the UE and the network. The RRC layer can be distributively located at network nodes including Node B, an AG and the like or can be independently located at either the Node B or the AG.

Figure 2:
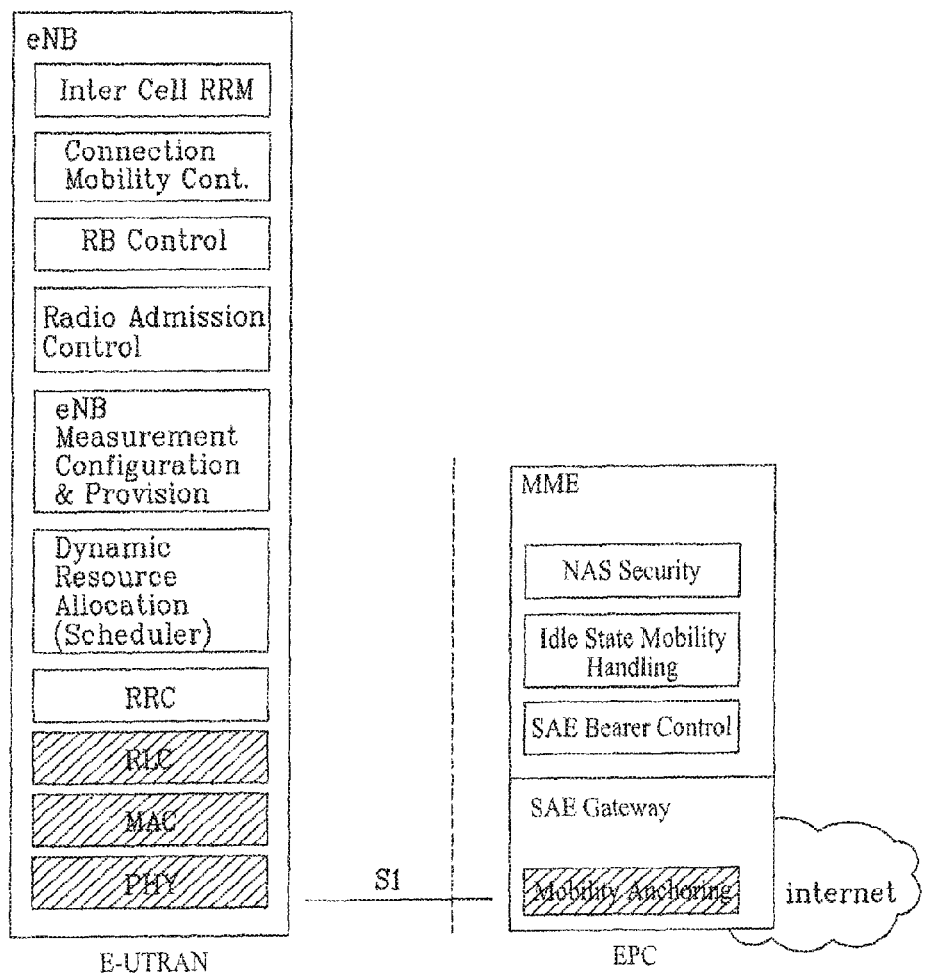
FIG. 2 is a schematic view illustrating an E-UTRAN (Evolved Universal Terrestrial Radio Access Network;)

FIG. 2 is a schematic view illustrating an E-UTRAN (UMTS terrestrial radio access network). In FIG. 2, a hatching part represents functional entities of a user plane and a non-hatching part represents functional entities of a control plane.

Figure 3A:
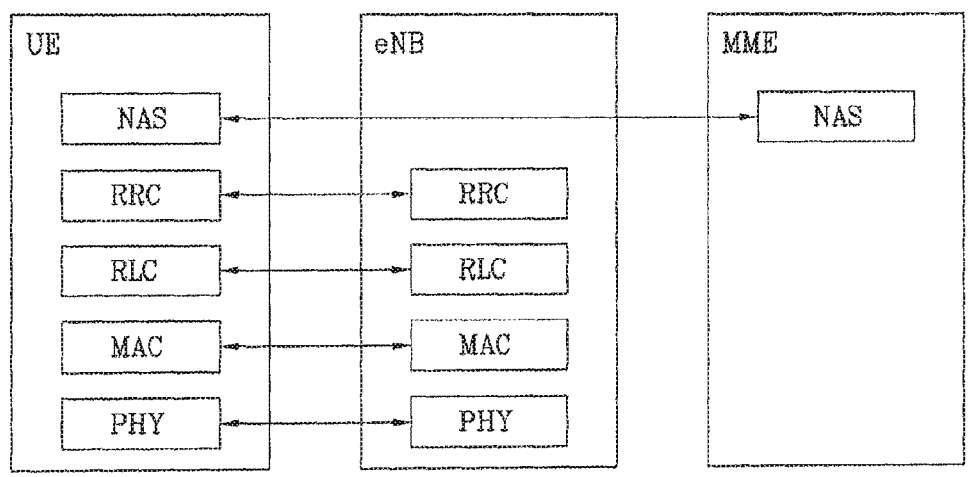
Figure 3B:
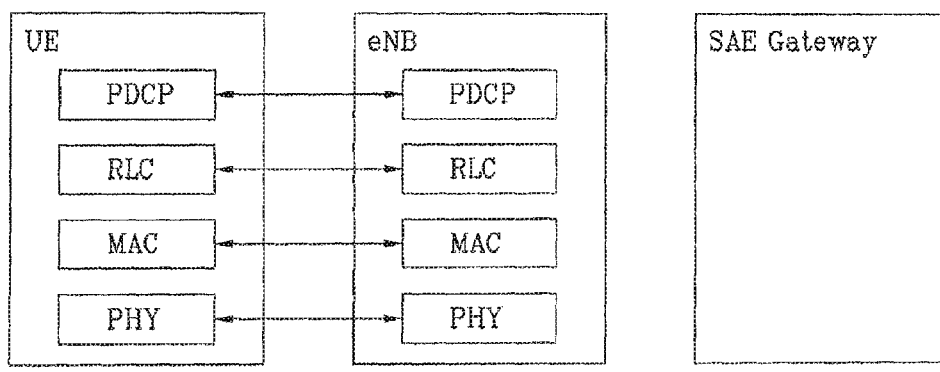

FIG. 3A and FIG. 3B illustrate a structure of a radio interface protocol between the user equipment (UE) and the E-UTRAN, in which FIG. 3A is a schematic view of a control plane protocol and FIG. 3B is a schematic view of a user plane protocol. Referring to FIG. 3A and FIG. 3B, a radio interface protocol horizontally includes a physical layer, a data link layer, and a network layer, and vertically includes a user plane for data information transfer and a control plane for signaling transfer. The protocol layers in FIG. 3A and FIG. 3B can be classified into L1 (first layer), L2 (second layer), and L3 (third layer) based on three lower layers of the open system interconnection (OSI) standard model widely known in the communications systems.

The physical layer as the first layer provides an information transfer service to an upper layer using physical channels. The physical layer (PHY) is connected to a medium access control (hereinafter, abbreviated as 'MAC') layer above the physical layer via transport channels. Data is transferred between the medium access control layer and the physical layer via the transport channels. Moreover, data is transferred between different physical layers, and more particularly, between one physical layer of a transmitting side and the other physical layer of a receiving side via the physical channels. The physical channel of the E-UMTS is modulated in accordance with an orthogonal frequency division multiplexing (OFDM) scheme, and time and frequency are used as radio resources.

The medium access control (hereinafter, abbreviated as 'MAC') layer of the second layer provides a service to a radio link control (hereinafter, abbreviated as 'RLC') layer above the MAC layer via logical channels. The RLC layer of the second layer supports data transfer with reliability. In order to effectively transmit IP packets (e.g., IPv4 or IPv6) within a radio-communication period having a relatively narrow bandwidth, a PDCP layer of the second layer (L2) performs header compression to reduce unnecessary control information.

A radio resource control (hereinafter, abbreviated as 'RRC') layer located on a lowest part of the third layer is defined in the control plane only and is associated with configuration, reconfiguration and release of radio bearers (hereinafter, abbreviated as 'RBs') to be in charge of controlling the logical, transport and physical channels. In this case, the RB means a service provided by the second layer for the data transfer between the UE and the UTRAN.

As downlink transport channels carrying data from the network to UEs, there are provided a broadcast channel (BCH) carrying system information, a paging channel (PCH) carrying paging message, and a downlink shared channel (SCH) carrying user traffic or control messages. The traffic or control messages of a downlink multicast or broadcast service can be transmitted via the downlink SCH or an additional downlink multicast channel (MCH). Meanwhile, as uplink transport channels carrying data from UEs to the network, there are provided a random access channel (RACH) carrying an initial control message and an uplink shared channel (UL-SCH) carrying user traffic or control message.

As logical channels located above the transport channels and mapped to the transport channels, there are provided a broadcast control channel (BCCH), a paging control channel (PCCH), a common control channel (CCCH), a multicast control channel (MCCH), and a multicast traffic channel (MTCH).

In the E-UMTS, an orthogonal frequency division multiple (OFDM) technique is used on the downlink and a single carrier frequency division multiple access (SC-FDMA) technique on the uplink. The OFDM technique using multiple carriers allocates resources by unit of multiple sub-carriers including a group of carriers and utilizes an orthogonal frequency division multiple access (OFDMA) as an access scheme.

In a wireless communication system which uses multiple carrier technique, such as OFDM or OFDMA, radio resources are a set of continuous sub-carriers, and are defined by a time-frequency region on a two-dimensional sphere. One time-frequency region in the OFDM or OFDMA is identified by a rectangular form sectioned by time and sub-carrier coordinates. In other words, one time-frequency region could be identified by a rectangular form sectioned by at least one symbol on a time axis and a plurality of sub-carriers on a frequency axis. Such a time-frequency region can be allocated to an uplink for a specific UE, or a base station can transmit the time-frequency region to a specific user equipment (UP) in a downlink. In order to define such a time-frequency region on the two-dimensional sphere, the number of OFDM symbols in the time region and the number of continuous sub-carriers in the frequency region should be given, wherein the continuous sub-carriers start from a point having an offset from a reference point.

The E-UMTS which is currently being discussed uses 10 ms radio frame comprising 10 sub-frames. Also, one sub-frame includes two continuous slots. One slot has a length of 0.5 ms. One sub-frame comprises a plurality of OFDM symbols and a part (for example, first symbol) of the plurality of OFDM symbols can be used for transmission of L1/L2 control information.

Figure 4:
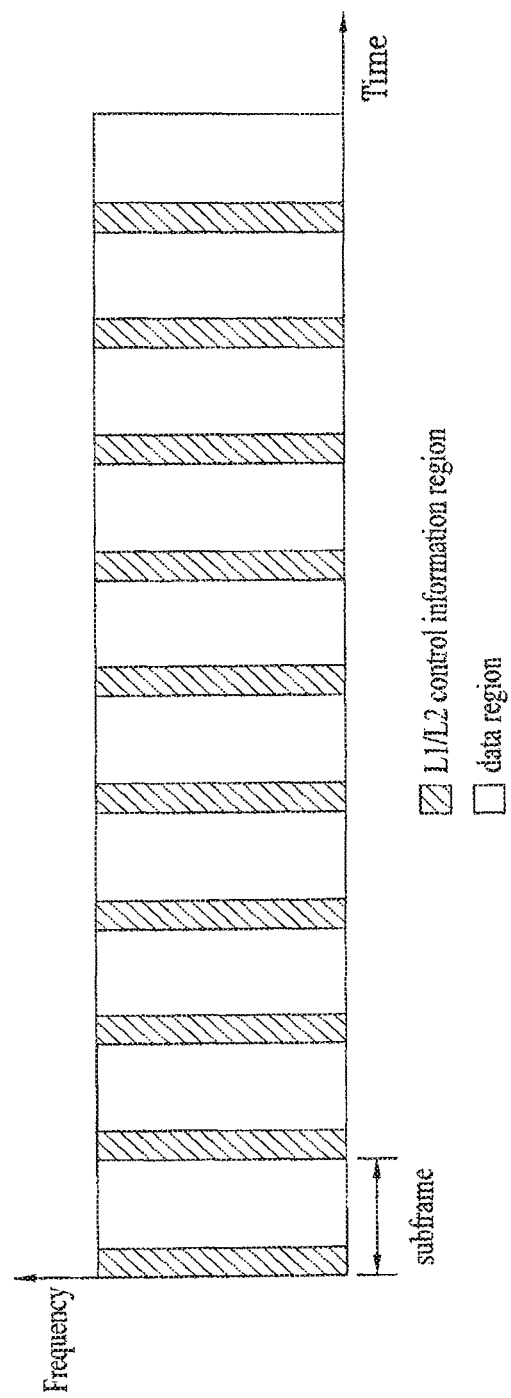
FIG. 4 is a diagram illustrating an example of a physical channel used in an E-UMTS.

FIG. 4 is a diagram illustrating a structure of a physical channel used in the E-UMTS. In FIG. 4, one sub-frame comprises an L1/L2 control information transmission region (the hatching part) and a data transmission region (the non-hatching part).

Figure 5:
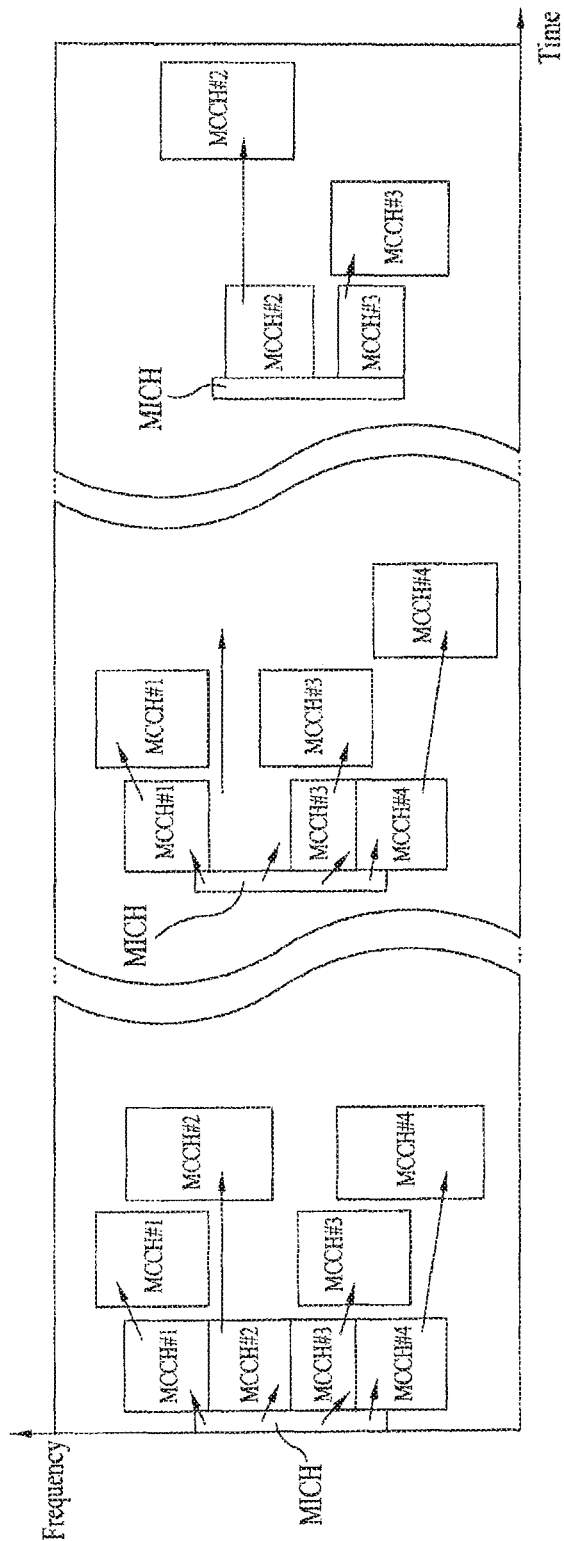
FIG. 5 is diagram illustrating a frame structure according to one embodiment of the present invention.

FIG. 5 is a diagram illustrating a frame structure according to one embodiment of the present invention. According to the embodiment of FIG. 5, technical features of the present invention are applied to the case where the network provides MBMS to at least one user equipment. Hereinafter, description will be made only if necessary for understanding of the embodiment according to the present invention, and description of a general procedure required for communication between a network and a user equipment will be omitted.

In the embodiment of FIG. 5, the network provides at least one or more MBMSs within an area which includes one cell or a plurality of cells. Also, in order to transmit control information related to the at least one or more MBMSs, a plurality of MCCHs are established within the area which includes one cell or a plurality of cells. The MCCH may comprise at least one primary MCCH (P-MCCH) and at least one secondary MCCH (S-MCCH). For example, in order to transmit control information for one or more MBMSs provided within one cell or one area, two P-MCCHs and a plurality of S-MCCHs can be established.

The network can provide a MBMS in accordance with a single-cell transmission mode or a multi-cell transmission mode. In case of the single-cell transmission mode, the MBMS is provided in one cell, and MTCH and MCCH which are logical channels are mapped to a downlink shared channel (DL-SCH) which is a transport channel, for point-to-multipoint transmission. In case of the multi-cell transmission mode, synchronous transmission is performed for the MBMS by base stations included in a plurality of cells within an area i.e., an MBMS single frequency network (MBMSFN) area. The user equipment can receive the MBMS by combining MBMS data transmitted from the plurality of cells. In this case, the MTCH and the MCCH are mapped to the multicast channel (MCH) for point-to-multipoint transmission. Scheduling is performed by an e-Node B (eNB) in the single-cell transmission mode but scheduling in the multi-cell transmission mode is performed by an upper entity of the eNB, i.e., a multi-cell/multicast coordination entity (MCE).

In FIG. 5, the eNB or the MCE transmits a notification message which includes indication information and an identifier (MBMS RNTI) of the MBMS, wherein the indication information indicates at least one or more MCCHs related to each MBMS among a plurality of MCCHs established for transmission of control information related to at least one or more MBMSs. The notification message can be transmitted through a downlink channel of the L1/L2 control information transmission region, for example, MBMS notification indicator channel (MICH). The MICH is used for notifying the user equipment of session start, session stop, or session change with respect to the specific MBMS, and can have the same physical structure as that of the PDCCH.

In order to indicate what MCCH is control information for what MBMS, the indication information can include at least one MCCH RNTI and allocation information of a downlink radio resource through which the at least one MCCH is transmitted. The allocation information includes information indicating a time-frequency region through which each MCCH is transmitted. Each MCCH RNTI is mapped to its corresponding MBMS identifier. In this case, the notification message can include one MBMS identifier and its corresponding MCCH identifier, or can include a plurality of MBMS identifiers and MCCH identifiers corresponding to the respective MBMS identifiers. The notification message can further include an identifier of a user equipment which receives the at least one MBMS or desires to receive the at least one MBMS. The indication information can indicate a specific P-MCCH among a plurality of P-MCCHs or can indicate a specific S-MCCH among a plurality of S-MCCHs. Alternatively, the indication information can indicate at least one P-MCCH and at least one S-MCCH among a plurality of P-MCCHs and a plurality of S-MCCHs.

The user equipment receives the notification message by monitoring the MICH periodically or non-periodically. If an identifier for the MBMS which the user equipment receives or desires to receive, and an MCCH identifier corresponding to the MBMS identifier are included in the notification message, the user equipment acquires control information required to receive MBMS by receiving the corresponding MCCH.

In the embodiment of FIG. 5, downlink channels (MCCH #1 to MCCH #4) are established for MBMS services (MBMS #1 to MBMS #4). The user equipment, which receives MBMS #1 or desires to receive MBMS #1, receives the MICH, and receives the MCCH #1 using allocation information of MCCH #1 mapped to MBMS #1 included in the notification message of the MICH. If additional control information is required for MBMS #1, allocation information of additional MCCH #1 can be provided to MCCH #1 so that the user equipment can receive additional MCCH #1 using the allocation information. The aforementioned description can be applied to the operation of the user equipment which receives or desires to receive MBMS #2 to MBMS #4.

According to another embodiment, the notification message transmitted through the L1/L2 control channel can include a change indicator indicating that MCCH related to a specific MBMS has been changed. The user equipment, which receives or desires to receive the specific MBMS, receives the changed MCCH if it receives the change indicator. However, the user equipment does not receive the corresponding MCCH if it does not receive the change indicator.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between a base station and a user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the random access method in the wireless communication system according to the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method of processing data in a wireless communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention, should be determined by reasonable interpretation of the appended claims and all change which comes within the equivalent scope of the invention are included in the scope of the invention.

What is claimed:

1. A method of receiving a signal associated with a broadcast service, the method comprising:

receiving, by a user device, the signal through a physical channel from a network, the signal carrying a plurality of OFDM (Orthogonal Frequency Division Multiplexing) symbols in a time domain and a plurality of subcarriers in a frequency domain, wherein the plurality of OFDM (Orthogonal Frequency Division Multiplexing) symbols carry a frame, wherein a part of continuous OFDM symbols in the frame is used for transmission of a physical signal channel including Layer 1 (L1) information and a remaining part of continuous OFDM symbols in the frame is used for transmission of a data channel in a physical layer, wherein the physical signal channel is located before the data channel in the frame, wherein the Layer 1 (L1) information includes first information, the first information being signaled for the associated broadcast service, wherein the first information indicates a change of second information related to the associated broadcast service; and wherein the Layer 1 (L1) information includes identification information for uniquely identifying a data channel for carrying the associated broadcast service, and allocation information on position of the associated broadcast service in the frame.

2. The method of claim 1, wherein the frame further includes Layer 2 (L2) information channel and wherein the Layer 1 (L1) information and the Layer 2 (L2) information are periodically received.

3. The method of claim 1, wherein the allocation information indicates address information of the data channel in the time or frequency-domain.

* * * * *